United States Patent

Stone et al.

[15] 3,688,584

[45] Sept. 5, 1972

[54] INTERFEROMETRIC GRAVITY GRADIOMETER INCORPORATING RETROREFLECTORS AND MEANS TO CORRECT FOR THEIR RELATIVE SHIFTING

[72] Inventors: Richard S. Stone, Lexington, Mass. 02173; Lawrence B. Lapson, Boston, Mass. 02118

[73] Assignee: Arthur D. Little, Inc., Cambridge, Mass.

[22] Filed: Feb. 9, 1971

[21] Appl. No.: 113,892

[52] U.S. Cl. .................................................73/382
[51] Int. Cl. ..............................................G01v 7/04
[58] Field of Search ........................................73/382

[56] References Cited

UNITED STATES PATENTS 3,500,688  3/1970  Hudson ........................73/382
3,011,346  12/1961  Garvin ..........................73/382
3,417,621  12/1968  Schulze et al ................73/382

Primary Examiner—James J. Gill
Attorney—Bessie A. Lepper

[57] ABSTRACT

Apparatus for measuring gravity gradients directly. Two retroreflectors are caused to experience free flight, and the radiation reflected by these retroreflectors during free flight is directed to a radiation receiver which senses and measures the temporal variations of intensity of the interfering reflected radiation beams. The time rate of change of the frequency of the output signal of the receiver is directly related to the vertical gradient of gravity. The instrument of this invention has means to correct for any shifting of the retroreflectors relative to each other and to the radiation beam in planes normal to the radiation beam.

7 Claims, 14 Drawing Figures

Richard S. Stone
Lawrence B. Lapson
INVENTORS

Richard S. Stone
Lawrence B. Lapson
INVENTORS

BY *Bernie A. Lapson*
Attorney

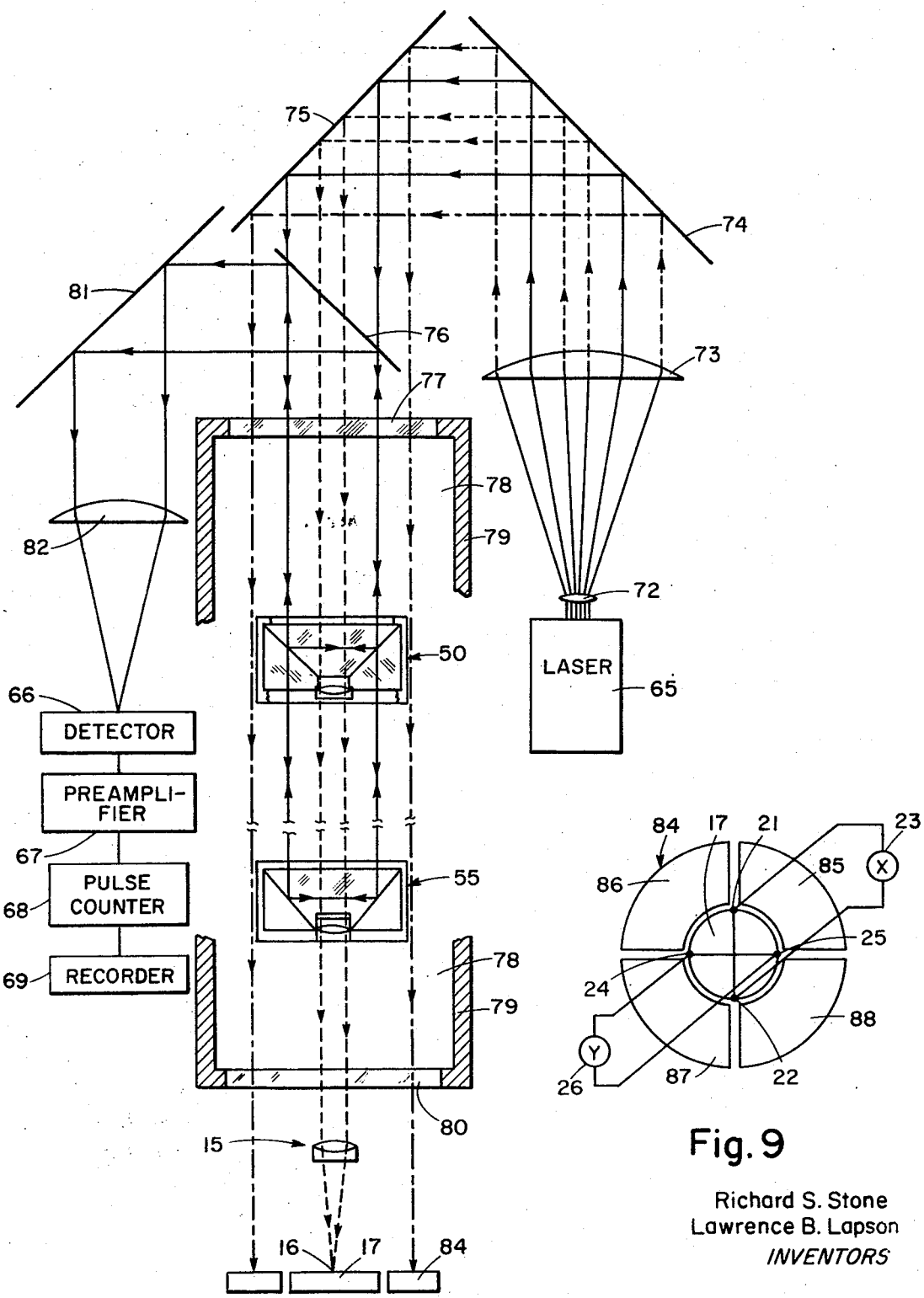

Richard S. Stone
Lawrence B. Lapson
INVENTORS

Richard S. Stone
Lawrence B. Lapson
INVENTORS

INTERFEROMETRIC GRAVITY GRADIOMETER INCORPORATING RETROREFLECTORS AND MEANS TO CORRECT FOR THEIR RELATIVE SHIFTING

This invention relates to a gravity gradiometer and more particularly to an instrument capable of providing a direct measurement of gravity gradient when mounted on a moving platform.

The determination of gravity gradients has long been known to be a very desirable way of sampling relatively large volumes of strata because of the simple dependence of the vertical gravity gradient of the density of the strata. As an example, the determination of gravity gradients may be widely used to detect the presence and to evaluate the extent of ore bodies and oil reserves beneath the surface of the earth. Direct-reading gravity gradiometers have been proposed. (See for example U.S. Pat. Nos. 2,618,156, 3,011,346, 3,095,744, 3,180,151 and 3,250,133.) However, the practical utility of such instruments is hindered by technical difficulties which are encountered in confined spaces such as boreholes or aboard moving platforms.

In addition to the use of a gravity gradiometer in such static-type measurements in boreholes and the like, the gravity gradiometer has great potential in surface prospecting in which gravity gradients are measured and plotted over a surface area, whether the area is land or water. On land, this may be done by stopping at predetermined points and making measurements. This same process may also, of course, be done on the water surface. However, this method of periodically stopping to determine gravity is a very expensive way of obtaining such measurements and often the terrain or sea conditions make such measurements hazardous or even impossible. This in turn has led to making gravity measurements over an area from an airplane or helicopter. Presently available instruments are, however, influenced by the motion of the airplane or helicopter and the "noise" resulting from such motion detracts from their useful sensitivity. Thus the use of a gravity gradiometer in general surface prospecting indicates that the instrument should be one which in its operation is independent of vehicle motion.

In a copending application, Ser. No. 25,153, filed Apr. 2, 1970, and in a continuation-in-part application, Ser. No. 62,008 filed Aug. 7, 1970, in the name of Richard S. Stone and assigned to the same assignee as this application, there is described a novel gravity gradiometer. In this gradiometer two retroreflecting bodies are caused to undergo free flight and the radiation reflected by the bodies during free flight is caused to interfere at a radiation detector. The detector output is a measure of the successive constructive and destructive interference between the two reflected beams as the separation between the retroreflecting bodies changes during free flight. The time rate change of frequency of the detector output signal is directly related to the vertical gradient of gravity. In another copending application Ser. No. 62,070, filed Aug. 7, 1970, in the name of Peter C. von Thuna and assigned to the same assignee as this application, there is described an improvement of the instrument of Ser. Nos. 25,153 and 62,008, the improvement embodying, among other features, the use of one of the radiation reflecting bodies as a beam splitter. Finally, in a fourth copending application Ser. No. 62,110 filed Aug. 7, 1970, in the names of Richard S. Stone, Donald L. Sullivan and Peter C. von Thuna and assigned to the same assignee as this application, there is described a gravity gradiometer of the type of Ser. Nos. 25,153 and 62,008 which incorporates means to determine, and if desired correct for, deviations of the optical axis of the instrument from the local vertical, means to detect and correct for rotational motion of the instrument which will cause undesirable Coriolis accelerations and means to compensate for undesirable horizontal motion. The gravity gradiometer disclosed and claimed in Ser. No. 62,110 is particularly suitable for use aboard moving platforms such as ships, planes and helicopters. In the gravity gradiometer of this type which must generate final informational data free from external physical influences, the two retroflecting bodies as they undergo free flight remain at nearly a constant distance relative to each other, but there may occur some relative displacement between the optical centers of the two retroflectors in a plane normal to the direction of the incoming parallel beam of radiation. This in turn results in a small systematic error, which is proportional to $v_{EW}$, the East-West component of the relative velocity of the two bodies. The gravity gradiometer of this invention provides a means for sensing this additional systematic error in a manner to permit the final values of gravity gradients to reflect the necessary corrections required by virtue of the shift of the optical center of one retroreflector relative to the optical center of the other retroreflector and the axis of the radiation beam.

It is therefore a primary object of this invention to provide an improved apparatus for directly measuring gravity gradients from a moving platform. It is another object to provide an apparatus of the character described which in its operation from a moving platform is substantially free of systematic errors which may otherwise be caused by changes in the attitude of the platform and movement of the platform as well as the shifting of one retroreflector with respect to the other in free flight. An additional object of this invention is to provide a rugged and reliable gravity gradiometer which is particularly suitable for operation in an airplane, helicopter or ship, thereby providing means for general surface prospecting in a rapid and direct manner.

The invention accordingly comprises features of construction, combinations of elements and arrangement of parts which will be exemplified in constructions hereinafter set forth, and the scope of the invention will be indicated in the claims.

For a fuller understanding of the nature and objects of the invention, reference should be had to the following detailed description taken in connection with the accompany drawings in which FIG. 1 is a simplified diagram of the optics involved when two retroreflecting bodies move along a vertical axis, with the spacing between them remaining essentially constant, while shifting relative to each other and the collimated beam in planes normal to the vertical axis of the beam;

FIG. 8 is a diagram of the optics of the gravity gradiometer of this invention;

FIG. 9 is a top plan view of a detector system combining the detection of $v_{EW}$ and translational motion of the instrument;

Figure 1:
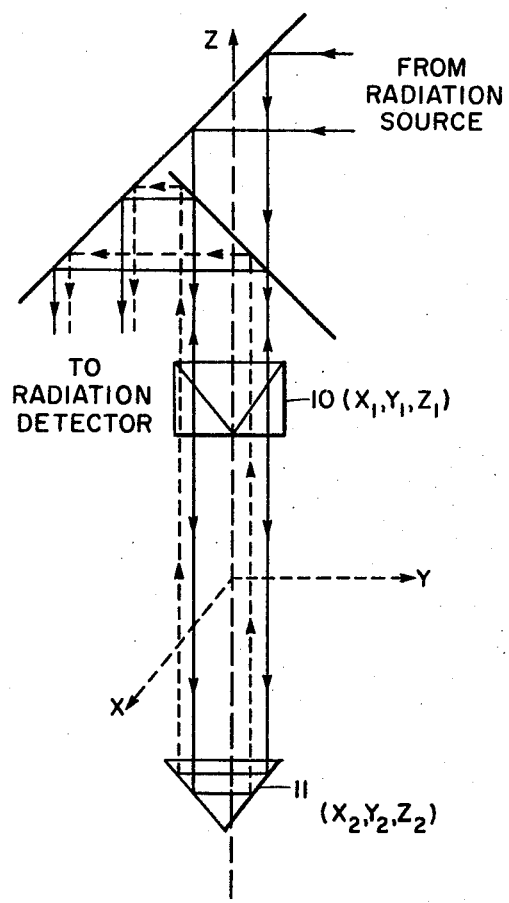

The gravity gradiometer of this invention employs two retroreflecting assemblies, one of which is directly above the other as disclosed in the above-mentioned Ser. No. 62,110. As in Serial No. 62,070, one of these retroreflecting assemblies also serves as a beam splitter. In contrast to the apparatus of Ser. No. 62,070, the retroreflecting beam splitter in the apparatus herein described is the upper retroreflecting body. Each of the retroreflecting assemblies in the apparatus of this invention also has incorporated as an integral component a lens assembly which serves as a component of the optical systems used in detecting and measuring $v_{EW}$. The apparatus of this invention also incorporates the means to sense the systematic angular deviation of the instrument from a predetermined orientation and to develop error signals which are proportional to $\Theta_I$ the angular deviation of the axis of the instrument housing from the vertical in any direction, $\Theta_{EW}$ which is the angular deviation in an East-West direction of the axis of the instrument housing from the local vertical, and $d\Theta_{EW}/dt$ which is the time rate of change of the angular deviation in an East-West direction.

The retroreflecting assemblies within the instrument are caused to undergo free flight under gravity with vertical separation known at one point in time. Energy is furnished in the form of a single beam of radiation of substantially coherent, and preferably monochromatic, radiation; and it is transmitted to the two retroreflectors which are experiencing free flight for reflection to a receiver/detector in such a way as to bring about optical interference. The receiver/detector measures the temporal variation of resultant intensity of the interfering reflected radiation beams. This temporal variation of the output signal of the detector will be substantially as diagrammed in FIG. 12. The time rate of change of the frequency of this signal is directly related to the vertical gradient of gravity. In the absence of a gravity gradient, that is, if the gravity is everywhere constant, a constant signal frequency anywhere from zero to a few thousand Hertz will be obtained, depending upon the relative initial velocity of the retroreflectors. In the presence of a gravity gradient, one of the retroreflectors experiencing free flight will be accelerated more than the other and the relative velocity of the retroreflectors will change with time. The signal frequency, which is a measure of relative velocity, will change at a rate directly proportional to the difference in gravity at the two retroreflector locations, and since the retroreflector separation will be nearly constant the frequency of the signal will be directly related to the gravity gradient.

Gravity measuring devices have been disclosed which use a single falling body and interferometric techniques. (See "An Absolute Interferometric Determination of the Acceleration of Gravity" by James E. Faller, Palmer Physical Laboratory, Princeton University, Princeton, N.J., Mar. 1963 and U.S. Pat. No. 3,429,184.) However, these devices are not capable of measuring gravity gradients directly nor are they capable of coping with systematic errors inherent in a gravity gradiometer carried on a moving platform such as an aircraft or ship. In addition to the systematic errors it is also necessary to cope in some manner with structural and optical design problems brought about through horizontal acceleration and deceleration of the moving platform as well as the possible shifting of one retroreflecting assembly relative to the other in an x–y plane during free flight. In the apparatus of this invention rotational and translational degrees of freedom are provided for the instrument to substantially eliminate the systematic errors and simplify the mechanical and optical design of the instrument and means are also provided to continuously detect and evaluate any shifts of the retroreflecting assemblies relative to each other and the radiation beam.

Before describing in detail the means for detecting and measuring any relative shifting of the retroreflecting assemblies and the incorporation of these means into the gravity gradiometer of this invention, it will be helpful to define the problem of retroreflecting assembly shifting and to delineate the parameters involved. This may be done with reference to FIGS. 1–3.

In FIG. 1 two retroreflecting bodies 10 and 11 are shown schematically as corner cubes. The term "retroreflector" is used hereinafter to designate any optical device that will provide a reflected ray parallel and traveling in the opposite direction to an incident ray independent of the angular orientation of the retroreflector. The term "corner cube" is used hereinafter to mean a retroreflector which is a geometrical figure having three orthogonal plane surfaces. The upper corner cube 10 is constructed to also serve as a beam splitter as will be explained later. In the operation of the gravity gradiometer of the type of this invention, the two retroreflectors are caused to experience free flight in the z direction in a manner so that $z_2 - z_1$ remains essentially constant. However, some slight shifting of the retroreflectors in their respective x–y planes, normal to the z direction, is possible and it is necessary to sense and evaluate $(x_2-x_1)$ and $(y_2-y_1)$ to obtain the desired correction factor. As will be seen from FIG. 1, such a shifting causes the two beams of radiation reflected from the two retroreflectors in free flight to undergo a dynamic effect due to the rotation of the earth and thereby to introduce a systematic error. If uncorrected, this systematic error may lead to the measurement of what may be termed a pseudogradient.

Figure 2:
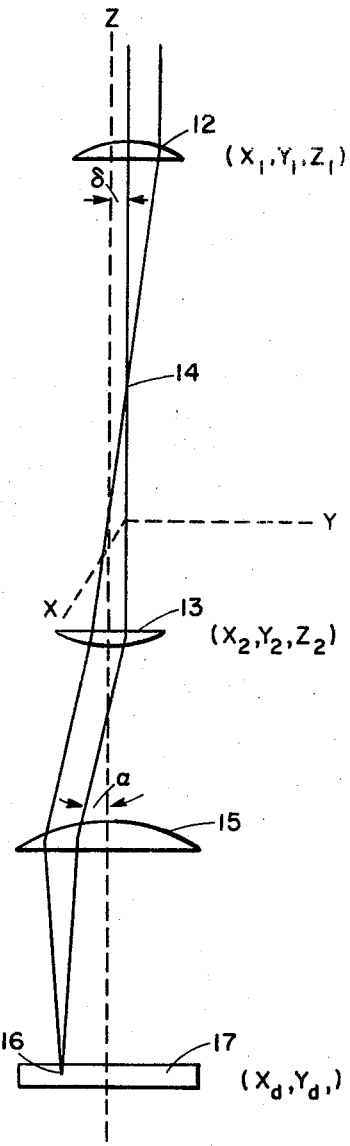
FIG. 2 is a simplified diagram of the system of FIG. 1 delineating the parameters under consideration when lenses are substituted for the bodies and they shift relative to each other to produce a systematic error proportional to $v_{EW}$.
Figure 3:
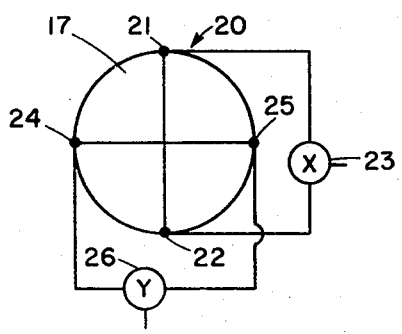
FIG. 3 is a top plan view of a detector suitable for sensing and evaluating the error proportional to $v_{EW}$.

Turning now to FIGS. 2 and 3 it will be seen how this shift is sensed and measured. In FIG. 2 the corner cubes are replaced for the purpose of this discussion by lens systems 12 and 13, respectively, shown in FIG. 2 as simple lenses for convenience of illustration. In the instrument to be described in detail below it will be shown how these lenses are made integral with the retroreflecting corner cubes 10 and 11. In the relative motion sensing means used in this apparatus, lens 12 focuses the fixed beam of collimated light to a point 14. Lens system 13 recollimates the light, but because there is a relative displacement $\delta$ of the retroreflectors 10 and 11, and hence between the two lens systems 12 and 13, in the planes normal to the direction $z$ of the incoming parallel beam, the beam emerging from lens system 13 is not parallel to the incident beam. This emerging beam is inclined at an angle $\alpha$ which is equal to $\delta/2f$ where $f$ is the focal length of lens system 12 and 13 $\delta \ll f$. By focusing the collimated beam from lens system 13 with a fixed lens 15, the focused spot 16 will move about in the focal plane of lens 15 in response to the relative motion of lens systems 12 and 13 in the $x$–$y$ plane, but will not move in response to concurrent and equal motions of both lenses (and therefore of both retroreflectors) in either the $x$, $y$ or $z$ directions. By placing an $x$–$y$ light position sensor 17 in the focal plane of fixed lens 15, there will be developed an electrical output proportional to $(x_2-x_1)$ and $(y_2-y_1)$ in the detector 20 illustrated in top plan view in FIG. 3. A number of different types of detectors are suitable. For example, a photographic film or television camera may be used to make visual recordings; or an especially made silicon photocell may be used to measure the different amount of impedance to each of the two sets of opposed contact points 21 and 22 connected with a voltmeter 23 associated with position along the $x$-axis and points 24 and 25 connected with a voltmeter 26 associated with position along the y-axis.

If as indicated in FIG. 2, $\alpha$ is defined as the angle made by the line between the optical centers of lens systems 12 and 13 (and hence between the optical centers of the retroreflectors on which they are mounted) and the direction of the imput beam of collimated light; if the $x$-direction coincides with the East-West direction; and if F is the focal length of fixed lens 15, then the position of focused spot 16 with respect to the $x$-axis is $x_d = F \sin \alpha$. By taking a reading of $x_d$ at time $t$ and at time $t + dt$, the increment $dx_d$ is obtained. Then for small values of $\alpha$ and $dt$ $$v_{EW} = (1/F)(dx_d)/dt.$$

It will be apparent that if the East-West direction does not coincide with the $x$-direction, then it is only a matter of calculating a vectorial sum.

Figure 4:
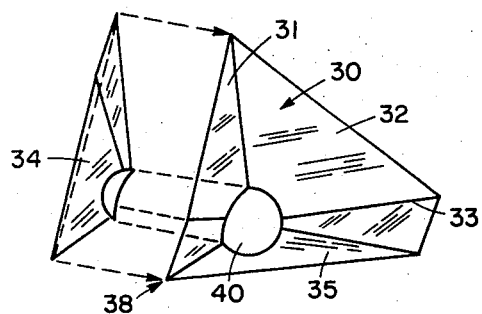
FIG. 4 is a perspective view illustrating the formation of the retroreflecting beam splitter which serves as the upper retroreflector in the gradiometer.
Figure 5:
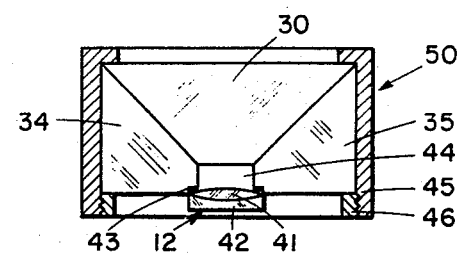
FIG. 5 is a cross section of an optical element which is a retroreflecting beam splitter incorporating a corner cube and a lens system suitable for use as one of the retroreflecting assemblies in the gravity gradiometer of this invention.
Figure 6:
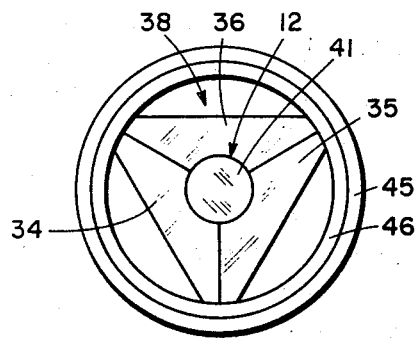
FIG. 6 is a bottom plan view of the retroreflecting assembly of FIG. 5.

The lens system 12 and 13 are mounted in the retroreflecting assemblies which undergo free flight in the gravity gradiometer. The formation and structures of the two retroreflecting assemblies are detailed in FIGS. 4–7. In the instrument of this invention, the upper retroreflector is also a beam splitter and it is formed in the manner illustrated in FIG. 4. The truncated corner cube 30 is solid and the three pyramidal reflecting surfaces 31, 32 and 33 (FIG. 4) are coated for partial reflection and partial transmission of light. Adhered to these three partially reflecting-partially transmitting surfaces of the corner cube are three optical elements 34, 35 and 36 formed of a radiation-transmitting material having the same index of refraction as the material from which the corner cube is formed. In FIG. 4, which is a perspective view showing the positioning of element 34 and the final position of element 35, and in FIG. 5, which is a top plan view of the retroreflecting beam splitter 38, the three optical elements are shown to be pyramidal in configuration. The resulting retroreflecting beam splitter of FIGS. 4 and 5 is triangular in cross section. However, it is possible to cut the three elements 34, 35 and 36 affixed to the partially reflecting-partially transmitting surfaces of corner cube 30 from a cylinder rather than a triangular blank to form a overall cyclindrical configuration.

Normally, the elements 34 and 35 and 36 will be formed of the same material as the corner cube and the adhering of these elements to the corner cube may be effected by any one of a number of suitable cements known in the art, the cement having substantially the same index of refraction as the corner cube material.

Coating of optical surfaces to render them partially reflecting and partially transmitting is well known in the art. The coating of the corner cube surfaces should be such as to essentially balance the intensities of the interfering beams.

The elements 34, 35 and 36 are configured to form an opening 40 and a recess 44 with the truncated side of corner cube 30 (FIGS. 4 and 5). Lens system 12 is mounted in opening 40. This lens system is seen to be made up of lenses 41 and 42 which together form a corrected diffraction limited lens system. As will be seen in the side elevational view of FIG. 5, in which the assembly mounting is shown in cross section, the lens system 12 is affixed to a peripheral groove 43 through a suitable cement or adhesive, and it is positioned over recess 44 to leave a spacing between the lens system and the corner cube. The retroreflecting beam splitter with the lens system is held within a mounting which comprises a cylindrical casing 45 which is slightly flanged inwardly on top and threaded around the bottom internal wall so that the retroreflecting beam splitter assembly 50 may be locked by a threaded ring 46. In the retroreflecting beam splitter assembly 50, the optical center of the assembly, i.e., the one and only point about which rotation of the assembly will not produce spurious changes in the interference signal, must coincide with the principal point of lens system 12. This is accomplished by bringing the principal point of lens system 12 into coincidence with this point of rotation and by designing casing 45 and threaded ring 46 of such weight that the center of gravity of assembly 50 is also made to coincide with these coincident points. When these requirements are met, the rotation about the center of gravity of the assembly will not affect the interferometer nor cause a translation of the principal point of the lens system 12.

The lower retroreflector is preferably also a truncated corner cube which may be hollow or solid. The pyramidal surfaces of the corner cube will be made essentially totally reflecting and the corner cube 56 will be mounted in an assembly 55 (FIG. 7) which includes a cylindrical casing 57 flanged slightly inwardly on the top to form a holding ring and which terminates around the bottom in a threaded ring adapted to receive a threaded disk 58 which has a central aperture 59. The periphery of this aperture serves to hold lens 41 of lens system 13 in place, and it is augmented in this function by the points of the corner cube formed when the cube is truncated. The lens system may be further adhered to the corner cube with a suitable adhesive. If corner cube 56 is solid, an inverted well of a depth to define a spacing 60 between the top wall of the inverted well and lens 42 is made in the cube. Under some conditions it may be desirable to extend the well completely through the corner cube, thus eliminating the possibility of astigmatism and other aberrations inherent in tilted plane parallel plates in the optical train of the relative motion stabilizer of this invention.

As in the case of the retroreflecting beam splitter assembly 50, the corner cube assembly 55 is designed to weight it in such a manner as to shift the center of gravity of the retroreflecting assembly to coincide with the optical center of corner cube 56 and principal point of lens assembly 13. In this assembly the thickness of apertured disk 58 and of casing 57 will be determined by the desired weight distribution, a factor which may, of course, also be adjusted by the choice of material from which the casing disk are formed.

Figure 7:
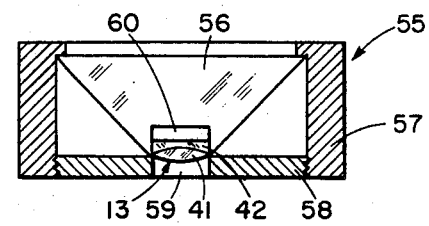
FIG. 7 is a cross section of an optical element which is a retroreflecting corner cube incorporating a lens system suitable for use as the other retroreflecting body in the gravity gradiometer of this invention.

In the gravity gradiometer of this invention the retroreflecting beam splitting assembly 50 of FIG. 5 is positioned above the retroreflecting assembly 55 of FIG. 7 as shown in the diagram of FIG. 8 which illustrates the optics of the instrument without attempting to show the relative spacing between elements because of the dimensional limitations imposed. These retroreflecting assemblies 50 and 55 are caused to undergo free flight under gravity with vertical separation known at one point in time. Energy is furnished in the form of a single beam of radiation derived from a single source of substantially coherent, and preferably monochromatic, radiation such as laser 65; and it is transmitted to the two retroreflectors in free flight for reflection to a detector 66, associated with a preamplifier 67, in a way to bring about optical interference. The detector measures the temporal variations of intensity of the interfering reflected radiation beams and through preamplifier 67 it actuates a pulse counter 68 which is connected to a recorder 69. The laser beam is widened and collimated by using any well-known suitable optical means such as lenses 72 and 73 shown in FIG. 8. The collimated light from the laser is then directed by mirrors 74 and 75 and beam splitter 76 through a top window 77 to strike the retroreflectors in their assemblies which are contained within an evacuated retroreflector chamber 78 defined by a cylindrical carriage 79 having a second bottom window 80. The collimated beam may be represented as being divided into three distinct beams serving three distinct purposes. The first of these, represented by the dot-dash lines in FIG. 8 is an outer beam ring used in connection with an annular ring detector 84 in determining common translation of the two retroreflectors with respect to the instrument axis. The second beam, represented by the solid lines comprises a major portion of the total light beam furnished by laser 65 and it is directed through beam splitter 76 to the retroreflecting beam splitting assembly 50 and through it to the retroreflecting assembly 55. Finally, the third beam, represented in FIG. 8 by dotted lines, comprises a small central beam which serves to detect and measure any shift of one retroreflector relative to the other as described in detail with regard to FIGS. 1–3. That beam which is reflected by the retroreflecting assemblies in free flight is directed to detector 66 by means of beam splitter 76, mirror 81 and a lens system (shown as lens 82) suitable for concentrating the retroreflected beam onto detector-preamplifier 67. Exemplary of the detector of the detector-preamplifier are solid state photodiodes (e.g., a silicon photodiodes) and photomultiplier tubes. Detector 84, the purpose of which will be detailed in the descriptions of FIGS. 10 and 11 is a four-quadrant detector, positioned with respect to the outer annular beam ring (dot-dash lines) so that an equal amount of radiation strikes each of the quadrants 85, 86, 87 and 88 (FIG. 9) when the axis of the beams reflected by the retroreflectors coincides with or is at a fixed distance from the axis of the instrument housing. Each of the four quadrants is connected to a position preamplifier (not shown) which is capable of receiving four different signals, two of which are responsive to movement of the annular beam in the x-direction and two of which are responsive to movement in the y-direction. The two signals associated with x-direction movement are transmitted to an x-position amplifier and the two signals associated with the y-direction movement to a y-position amplifier described in connection with FIG. 11.

Figure 10A:
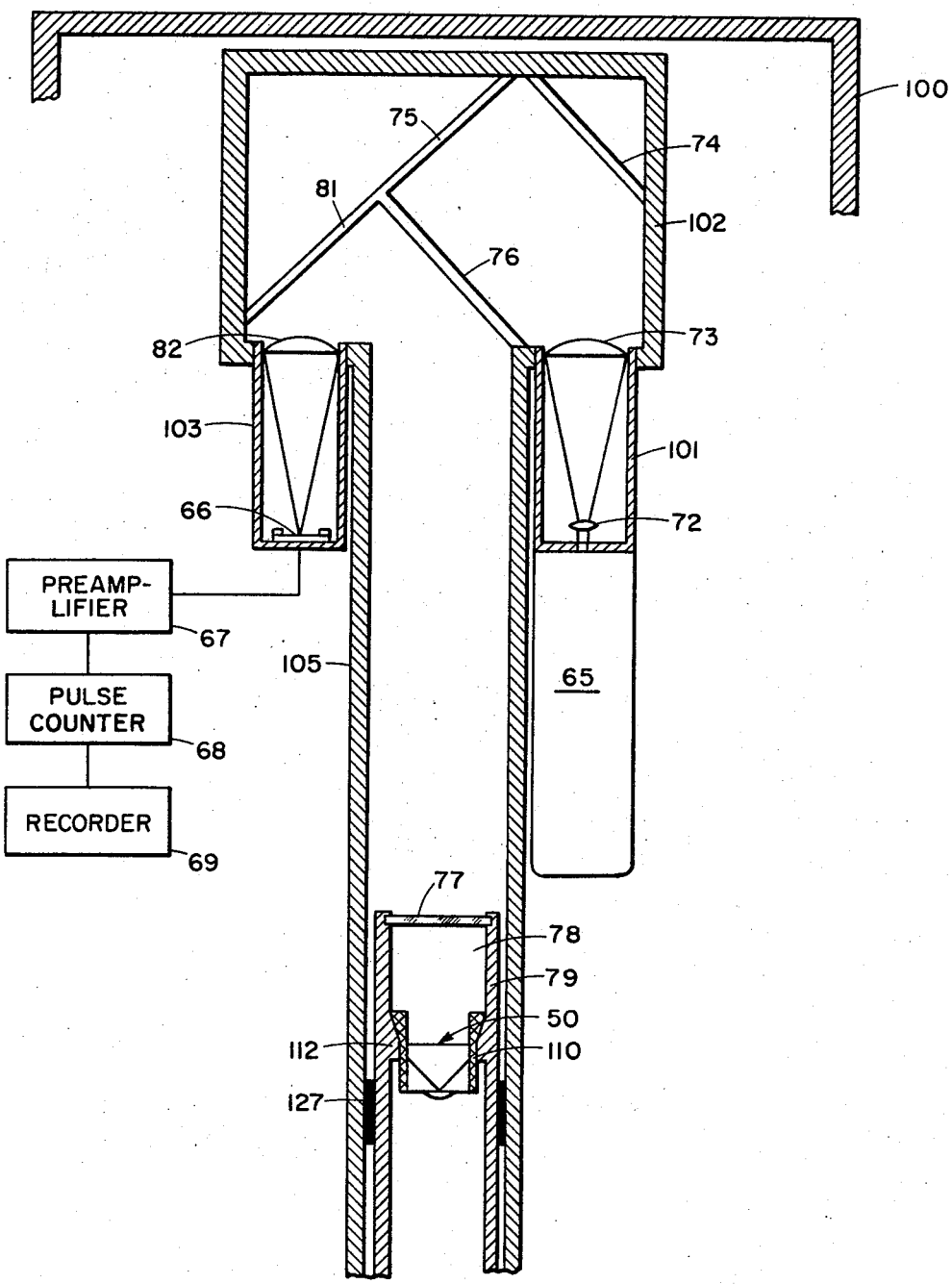
FIGS. 10A and 10B are in combination a longitudinal cross section of a portion of the gravity gradiometer of this invention.
Figure 10B:
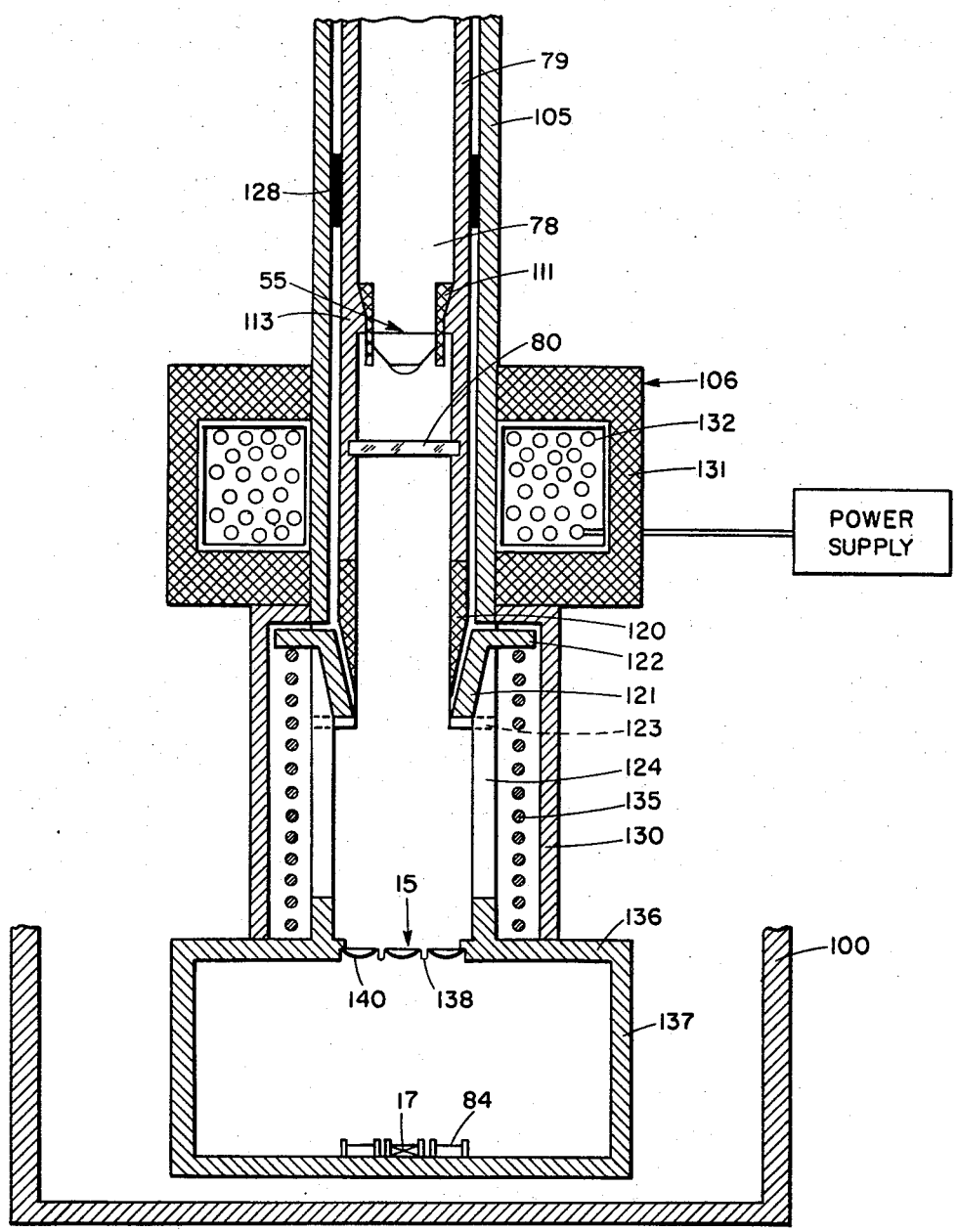
Figure 11:
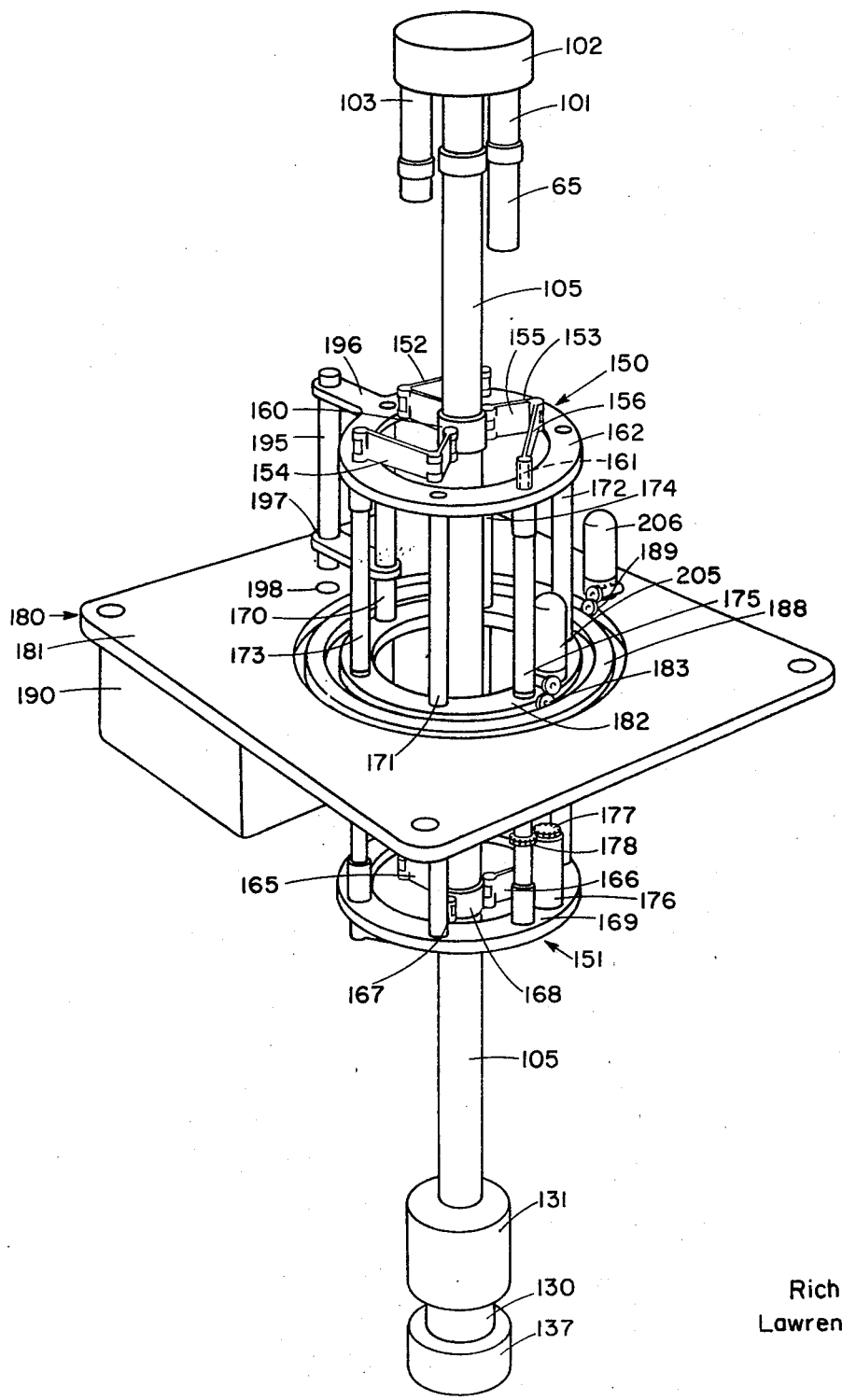
FIG. 11 is a perspective view of the gravity gradiometer of this invention without its external housing.

FIGS. 10A and 10B, in which like reference numerals are used to refer to like elements in the preceding drawings, are in combination a longitudinal cross section of the gravity gradiometer showing the optical elements and one embodiment of a suitable mechanism for placing the retroreflecting assemblies in free flight to obtain a measurement of gravity gradient.

The gradiometer is encased in an instrument housing 100 which provides the necessary support for the instrument components. The laser is attached to a lens housing 101, containing collimating lenses 72 and 73, which in turn is affixed to reflector housing 102 containing mirrors 74 and 81 and beam splitter 76. In similar fashion lens system 82 and the detector 66 are supported in detector housing 103 which is affixed to reflector housing 102. The mechanism for putting the retroreflectors in free flight condition which is hereinafter referred to as a "carriage" is located within carriage guide tube 105 formed as an elongated cylindrical tubing affixed at its upper end to reflector housing 102 and at it lower end to a carriage drive mechanism generally indicated by the reference numeral 106. As shown in FIG. 8, the carriage 79 is hermetically sealed at the top by window 77 and at the bottom by window 80 to define a carriage number 78 which is evacuated, preferably down to about $10^{-4}$ torr or lower, and which contains retroreflecting assemblies 50 and 55. The retroreflecting assemblies 50 and 55 are shown in FIG. 8 to have slightly outwardly flared top extensions 110 and 111, respectively. The internal wall of carriage 79 has annular rings 112 and 113 having slightly inwardly tapered inner surfaces complementing the surfaces of the flared top extensions 110 and 111 of the retroreflecting assemblies. The purposes of these configurations is to provide a support for the retroreflecting assemblies in the carriage during that period when the assemblies are not experiencing free flight.

Carriage 79 below window 80 has an annular armature 120 affixed thereto. This armature has a wall thickness which tapers off at the lower end to fit within a carriage support cone 121 which in cross section is formed as a truncated cone and has an upper outwardly extending flange 122. The carriage support cone 121 is slidably movable along its axis and fingers 123 are provided to serve as guides moving within tracks 124. The carriage 79 moves axially within carriage guide tube and upper and lower bearings 127 and 128 are provided to provide proper alignment. Surrounding the lower end of the carriage guide tube 105 and resting on spring housing 130 is the carriage drive mechanism, represented in FIG. 10 as a magnet 131 having coils 132 which are connected a power supply 133. A spring 135 which engages flange 122 of the carriage support cone and is supported on the top wall 136 of a detector housing 137 serves as the primary carriage driving means. This housing 137 has an opening 138 in the top wall in which are supported lens system 15 for focusing the central beam associated with the measurement of retroreflector relative assembly shift onto detector 17 and an annular lens system 140 for focusing the outer annular beam onto the four-quadrant detector 84.

The gravity gradiometer of FIGS. 10A and 10B is designed to make measurements continuously over a period of time, one cycle following another. In this instrument, the spring 135 serves as the primary driving means and it is supplemented by the magnetic driving means in a manner to insure that the retroreflectors reach their full height of travel during each cycle. Thus the carriage in falling during the previous cycle has put the spring in compression to begin the cycle and the energy dissipated in the spring is made up by pulsing current from supply 133 into coils 132 to energize magnet 131. The magnetic field, in turn, through the armature 120 imparts a small upward thrust to the carriage in addition to the principal thrust supplied by the spring. The carriage 79, as it is thus rapidly propelled upwardly carries retroreflecting assemblies 50 and 55 with it. In order to put the retroreflecting assemblies into free flight, it is necessary to slow down the speed of the carriage shortly after it begins its upward travel so that the retroreflecting assemblies may rise to their upper travel limits within the carriage by reason of their upward momentum. The slowing down of the carriage is brought about by the drag on the carriage as it leaves the magnetic structure while such forces are essentially absent within the evacuated carriage chamber to slow down the retroreflecting assemblies. The current in the coil may be controlled by known means to obtain the desired degree of control over the deceleration of the carriage. The carriage reaches its top-most position just before the retroreflecting assemblies begin to fall under the force of gravity, placing the retroreflecting assemblies above their supports in the carriage. Then the carriage falls with the retroreflecting assemblies still maintaining them free falling until the carriage is again slowed down as it enters the magnetic field and subsequently contacts the carriage support cone 121 and the retroreflecting assemblies are resting in their supports to begin another cycle. During that period of the cycle when the carriage is rising and falling, the current to the coils 132 is cut off.

FIG. 11 is a perspective view of the entire gravity gradiometer (without the outer instrument housing 100) showing the means for dealing with the primary systematic errors to be encountered in using the instrument mounted on a moving platform such as an airplane or helicopter. Before describing the apparatus of FIG. 11 in detail it will be helpful to present a brief discussion of these errors. The first of these systematic errors is proportional to the angular deviation, $\Theta_I$, of the instrument axis from the local vertical in any direction; the second, hereinafter designated as the second systematic error, is proportional to the angular deviation, $\Theta_{EW}$, in an East-West direction of the instrument axis from the local vertical; and the third error, hereinafter referred to as the third systematic error, is proportional to the time rate of change of the angular deviation, $d\Theta_{EW}/dt$, of the instrument axis from the vertical in the East-West direction.

The attitude of the platform on which the instrument is mounted (angle formed with the horizon) can shift the optical axis out of alignment with the local vertical, for if the platform forms an angle $\Theta_I$ with the horizon when the two retroreflectors are put into free flight condition, they will in their upward and subsequent downward motion trace a parabolic flight path which will cause them to strike the side of the instrument housing or otherwise to degrade the instrument performance. However, even if the lateral dimensions of the housing were large enough to eliminate this possibility, acceleration errors are introduced. Thus the first systematic error occurs because the basic measurement performed by the gradiometer is of the component of distance between the retroreflecting assemblies along the gradiometer axis. If the true value of gravity gradient at the time of measurement is $dg/dz$, the value of gradient sensed by the instrument is $(dg/dz) \cos \Theta_I$. This measured value must be corrected to the true value either by forcing $\Theta_I$ to be suitably small (angular stabilization of the instrument) or by recording the value of $\Theta_I$ at the measurement time and subsequently adjusting the measured data, or by some combination of the two approaches.

The second and third systematic errors are due to the so-called Coriolis effect. Because the earth is rotating about its spin axis the Coriolis effect causes any body which is moving with velocity $\vec{v}_R$ with respect to the earth to experience acceleration proportional to $\vec{v}_R$. In the gravity gradiometer, each of the retroreflecting assemblies experiencing free flight will, of course, fall approximately toward the center of the earth with an acceleration expressed as $$\vec{A} = \vec{g} - \vec{\omega}_e \times (\vec{\omega}_e \times \vec{r}) - 2\vec{\omega}_e \times \vec{v}_R$$

where $\vec{\omega}_e$ is the angular velocity of the earth and $\vec{r}$ is the position of the body with respect to the center of the earth.

The third term $$\vec{A}_{cr} = 2\vec{\omega}_e \times \vec{v}_R$$

is known as the Coriolis acceleration. The direction of the Coriolis acceleration is perpendicular to $\vec{\omega}_e$ and to $\vec{v}_R$ so that if $\vec{v}_R$ is resolved into East-West, North-South and vertical components, $\vec{v}_{EW}$, $\vec{v}_{NS}$ and $\vec{v}_V$, respectively, $\vec{v}_{EW}$ is the only component of $\vec{v}_R$ that produces a Coriolis acceleration with a component in the direction of the local vertical. Both North-South and vertical velocity components of $\vec{v}_R$ cause Coriolis acceleration in the East-West direction. The Coriolis acceleration component along the local vertical is $$A_{cr} = 2\omega_e\, v_{EW} \cos\phi$$

where $\phi$ is the geographical latitude of the body.

During operation the instrument is maintained in substantial alignment with the local vertical. As a result of non-uniform aircraft (or other platform) motion, small angular motions can be imparted to the gradiometer, i.e., it will tend to swing in its mounting about some center of rotation.

The second systematic error therefore arises from a combination of non-zero relative velocity of the retroreflectors at the time of their release to experience free flight, and the angular deviation, $\Theta_{EW}$, in the East-West direction of the gradiometer axis from the local vertical. If the initial retroreflector velocities along the instrument axis are $v_1(o)$ and $v_2(o)$, the vertical component of relative Coriolis acceleration of the two retroreflectors is $$A_{cr1} - A_{cr2} = \Delta A_{cr} = 2\omega_e \sin\Theta_{EW}[v_2(o) - v_1(o)]\cos\phi.$$

The third systematic error is caused by differences in East-West velocity of the two retroreflectors arising from rotational motion of the gradiometer.

If the East-West component of aircraft velocity is $V_A(EW)$ and the East-West component of angular deviation of the gradiometer axis from the vertical is $\Theta_{EW}$, then the vertical component of Coriolis acceleration from the first retroreflector is $$A_{cr_1} = 2\omega_e \left[\left(v_{A(EW)} + r_1 \frac{d\theta_{EW}}{dt}\right)\right] \cos\theta_{EW} \cos\phi$$

and for the second retroreflector is $$A_{cr_2} = 2\omega_e \left[\left(v_{A(EW)} - r_2 \frac{d\theta_{EW}}{dt}\right)\right] \cos\theta_{EW} \cos\phi$$

where $r_1$ and $r_2$ are the distances of the first and second retroreflectors from the point about which the gradiometer rotates.

The third systematic error, fully stated, is therefore $$\Delta A_{cr} = 2\omega_e \left[(r_1 + r_2) \frac{d\theta_{EW}}{dt}\right] \cos\theta_{EW} \cos\phi$$

Note that the gradiometer is inherently insensitive to the large Coriolis accelerations of the individual retroreflectors caused by the platform (aircraft) speed $v_A$.

As in the case of the first systematic error, the second and third systematic errors can be substantially eliminated by forcing $\Theta_{EW}$ and $d\Theta_{EW}/dt$ to be suitably small, by recording the values of $\Theta_{EW}$ and $d\Theta_{EW}/dt$ at the time of retroreflector release and subsequently correcting the measured data, or by a combination of these two approaches.

In most instances it will also be desirable to provide for the substantial elimination of any operational difficulties or errors encountered by reasons of the horizontal acceleration or deceleration of the platform during the making of measurements. If the platform were to accelerate or decelerate in a horizontal direction while the retroreflectors were in free flight and the instrument housing were rigidly affixed to the platform it becomes apparent that the axis of the housing would move relative to the axis along which the retroreflectors were travelling. Under these circumstances, the retroreflectors would eventually collide with the housing wall and it would not be possible to measure the gravity gradient. To make the housing sufficiently large in its lateral dimensions to prevent this would be to introduce undesirable limitations on the mechanical and optical design of the instrument.

Therefore, the gravity gradiometer of this invention is provided with means to cope with these systematic errors as well as means to detect and measure the shifting of the retroreflectors relative to the axis of the collimated radiation beam. This is accomplished by providing two rotational degrees of freedom and two translational degrees of freedom to adapt it for making accurate direct measurements of vertical gravity gradient from a moving platform. Provision of the rotational degrees of freedom makes it possible to substantially eliminate the systematic errors caused by the rotation of the instrument; and provision of the translational degrees of freedom materially simplifies the mechanical and optical design parameters of the instrument.

In the apparatus of FIG. 11, the two translational degrees of freedom are provided by the upper translation mechanism 150 and lower translation mechanism 151. Each of these mechanisms comprises three arms 152, 153 and 154 (made up of two pivoting sections such as exemplified by sections 155 and 156 of arm 153) which are pivotally mounted to an upper collar 160 affixed to the outside of carriage guide tube 105 and a pivot pin 161 mounted in an upper support ring 162. It will be appreciated that arms 152 and 154 in the upper translation mechanism are mounted in the same manner to upper collar 160 and upper support ring 162; and likewise corresponding arms 165, 166 and 167 in the lower translation mechanism are mounted to lower collar 168 and lower support ring 169 which is joined to the upper support ring through rods 170, 171 and 172. Movement of the upper and lower sets of arms is coordinated through three rods 173, 174 and 175 connected to the pivot pins.

The upper and lower translation mechanisms 150 and 151 are driven by a translation drive mechanism 176 which has a gear 177 engaging a gear 178 affixed to rod 175. The drive mechanism is actuated and controlled by signals received from the preamplifiers of the four-quadrant detector 84 (FIGS. 8–10). Any variation in radiation striking the quadrants 85, 86, 87 and 88 of that detector will be reflected in the signal transmitted to the translation drive mechanism to actuate the movement of the two sets of arms in a manner to bring the axis of the carriage guide tube 105 into coincidence with the axis of the two retroreflectors, thus providing for the substantial elimination of any operational difficulties or errors encountered by reasons of horizontal acceleration or deceleration of the platform during the making of measurements.

The three systematic errors are essentially eliminated through the use of a stabilized platform system 180 which comprises a platform 181, a port-starboard gimbal 182 mounted on bearing 183 and through which rods 173, 174 and 175 pass, a fore-aft gimbal 188 pivotally mounted to platform 181 on bearing 189, and an inertial reference 190 such as a commercially available apparatus based on the principle of the so-called "Schuler pendulum" described in *Aviation Week*, 64: 42 et seq (Jan. 9, 1956). An autocollimator 195 is held by two arms 196 and 197 in a position above platform 181 to direct a beam of collimated light through opening 198 to a suitably designed detector system (not shown) such as an optical system which permits the detection and measuring of the shift of the beam of light from autocollimator 195 in response to a shift in the position of the instrument with respect to the local vertial. The signals generated are representative of the direction and magnitude of the deviation in orientation, $\Theta_I$, $\Theta_{EW}$ and $d\Theta_{EW}/dt$, responsible for the three systematic errors. These signals are then transmitted to the port-starboard gimbal drive mechanism 205 and fore-aft gimbal drive mechanism 206 which drive their respective gimbals to stabilize the instrument. Thus the stabilized platform system 180 maintains the axis of the instrument aligned with the local vertical, thereby in effect providing the two rotational degrees of freedom to correct for the three systematic errors described.

In the operation of the apparatus shown in FIG. 10A–10B when the two retroreflecting assemblies 50 and 55 begin their free flights the radiation which reaches them from laser 65, or other suitable source, is reflected back to the detector 66 which senses the net radiation intensity of the two interfering beams and transmits this signal via preamplifier 67 to the pulse counter 68 and a suitable recording means 69 such as digital recorder. All of these components are well-known and commercially available. Their use in conjunction with a detector is also well-known and it is well within the skill of the art to incorporate them in one or another type of circuit to obtain the information in a desired form.

Figure 12:
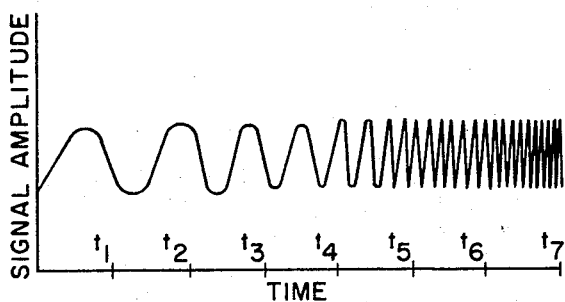
FIG. 12 is an exemplary plot, not to any scale, of Time versus Signal Amplitude determined by the detector.
Figure 13:
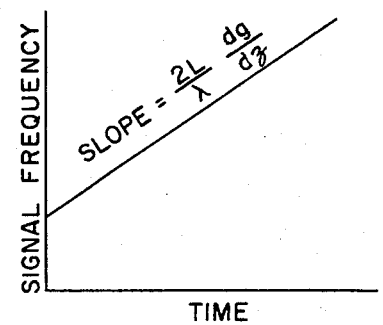
FIG. 13 is a plot of Time versus Interference Signal Frequency showing the direct measurement of gravity gradient.

As an example, the radiation intensity sensed by the detector 66 may take the form of signals indicating the change of radiation intensity with time as shown in FIG. 12. As the retroreflecting assemblies experience free flight, the beams reflected from them are superimposed upon each other prior to striking the detector and a time-varying interference signal is obtained as shown in FIG. 12. If the gravity gradient is constant during the fall, then the difference in vertical velocities of the two retroreflector assemblies is given to good approximation by $$v(t) = v_o + [l_o t(dg/dz)]$$

where $v_o$ is the initial velocity difference, $l_o$ is the difference between the two bodies at time $t = o$, and $dg/dz$ is the vertical gradient of gravity. Further, the frequency, $f$, of the interference signal is given by $$f(t) = 2v(t)/\lambda$$

where $\lambda$ is the wavelength of the radiation. Thus if the electronic pulse counter 68 of FIG. 10 counts and records the number of signal cycles per predetermined time unit $t_1, t_2 \ldots t_n$, it is possible to plot signal frequency versus elapsed time as is done in FIG. 13. If the two retroreflecting assemblies in falling experience a constant vertical gradient of gravity, then this plot will be a straight line. The slope of this line is directly related to the vertical gradient of gravity.

The signal frequency depends only on the relative vertical velocity of the retroreflecting assemblies in free flight. For this reason the measurement of $dg/dz$ is inherently independent of the motion of the instrument frame, the energy source, the detector-preamplifier or the moving vehicle in which the instrument may be mounted during the free flight time of his retroreflectors.

Apparatus constructed according to this invention can be made in a number of different forms suitable for installation on an airplane, helicopter or ship. The apparatus may be constructed in a rugged form thus making it particularly suitable for all types of prospecting and field applications.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:

1. In a gravity gradiometer in which radiation beams reflected by first and second retroreflecting assemblies, caused to experience free flight along a common axis, are sensed thereby to measure the temporal variations of intensity of the interfering reflected radiation beams, the improvement residing in the construction of said retroreflecting assemblies in which said first retroreflecting assembly is also a beam splitter and comprises, in combination a. a first solid truncated corner cube having its three reflecting surfaces coated to be partially reflecting and partially transmitting;

b. three optical elements formed of a material having the same index of refraction as the material from which said first solid corner cube is made, one of said elements being affixed to each of said three surfaces, said optical elements being shaped to define in combination with said first solid corner cube a geometrical configuration having a flat surface with a centrally positioned recess, said flat surface being parallel to the flat surface forming the base of said first corner cube;

c. first corrected diffraction limited lens means mounted over said recess and having a focal length essentially equal to half the distance maintained between said first and second retroreflecting assemblies experiencing free flight; and d. first casing means adapted to partially encase said geometrical configuration and having a weight distribution such that the center of gravity of said first retroreflecting assembly, the principal point of said first lens means and the optical center of said first solid corner cube all coincide;

and said second retroreflecting assembly comprising in combination
  e. a second truncated corner cube;
  f. second corrected diffraction limited lens means mounted on the truncated end of said second corner cube;
  g. second casing means adapted to partially encase said second corner cube and having a weight distribution such that the center of gravity of said second retroreflecting assembly, the principal point of said second lens means and the optical center of said second corner cube all coincide.

2. A gravity gradiometer in accordance with claim 1 wherein said second corner cube is solid and has a shallow recess defining a spacing between said second lens system and the interior of said second corner cube.

3. An apparatus for determining the vertical gradient of gravity from a moving platform, comprising in combination
  a. a first retroreflecting assembly, comprising in combination
    1. a first solid truncated corner cube having its three reflecting surfaces coated to be partially reflecting and partially transmitting;
    2. three optical elements formed of a material having the same index of refraction as the material from which said first solid corner cube is made, one of said elements being affixed to each of said three surfaces, said optical elements being shaped to define in combination with said first solid corner cube a geometrical configuration having a flat surface with a centrally positioned recess, said flat surface being parallel to the flat surface forming the base of said first corner cube;
    3. first corrected diffraction limited lens means mounted over said recess and having a focal length essentially equal to half the distance maintained between said first and second retroreflecting assemblies experiencing free flight; and
    4. first casing means adapted to partially encase said geometrical configuration and having a weight distribution such that the center of gravity of said first retroreflecting assembly, the principal point of said first lens means and the optical center of said first solid corner cube all coincide;
  b. a second retroreflecting assembly, comprising in combination
    1. a second truncated corner cube;
    2. second corrected diffraction limited lens means mounted on the truncated end of said second corner cube;
    3. second casing means adapted to partially encase said second corner cube and having a weight distribution such that the center of gravity of said second retroreflecting assembly, the principal point of said second lens means and the optical center of said second corner cube all coincide;
  c. first and second holding means adapted initially to retain said first retroreflecting means at a predetermined vertical level above said second retroreflecting assembly;
  d. carriage means containing said retroreflecting assemblies and being adapted to release them from said holding means in a predetermined timed sequence thereby to cause said first and second retroreflecting assemblies to experience free flight;
  e. a source of radiant energy in the form of a collimated beam;
  f. first radiant energy receiving means adapted to generate signals proportional to radiant energy received by reflection from said first and second corner cubes;
  g. optical means adapted to direct radiant energy reflected by said corner cubes to said first radiant energy receiving means as said retroreflecting assemblies experience free flight, said optical means including means to effect optical interference between the two beams of radiant energy reaching said radiant energy receiving means;
  h. means to receive said signals from said first radiant energy receiving means and to determine the temporal variations of intensity of the interfering reflected radiant energy beams;
  i. second radiant energy receiving means adapted to receive radiant energy transmitted through said first and second lens means of said first and second retroreflecting assemblies;
  j. a fixed lens positioned between said second holding means and said second radiant energy receiving means and being adapted to focus radiant energy from said second lens means of said second retroreflecting assembly onto said second radiant energy receiving means; and
  k. housing means adapted to define a chamber to contain and guide said carriage means.

4. A gravity gradiometer in accordance with claim 3 including
  l. third radiant energy receiving means in the form of four, equal-area annularly configured quadrants surrounding said second radiant energy receiving means and being adapted to receive radiant energy transmitted around the peripheries of said retroreflecting assemblies, to sense any relative shifting of said assemblies in planes normal to the axis of said collimated beam of radiant energy and to generate signals proportional to said shifting; and
  m. horizontal stabilizing means responsive to signals generated by and received from said third radiant energy receiving means and being adapted to be actuated by said signals from said third radiant energy receiving means thereby to impart two translational degrees of freedom to said housing means whereby said housing means will be maintained in an essentially fixed relationship with respect to said retroreflecting assemblies during free flight in spite of any acceleration or deceleration of the moving platform on which the gradiometer is located.

5. A gravity gradiometer in accordance with claim 4 wherein said horizontal stabilizing means comprises upper and lower sets of pivotally mounted arms pivotally attached to said housing, each set comprising three arms of two sections each and means to move said arms in response to said signals received from said third radiant energy receiving means.

6. A gravity gradiometer in accordance with claim 4 including n. angular deviation sensing means adapted to sense systematic angular deviation of said apparatus from a predetermined orientation and to develop error signals, said error signals being proportional to $\Theta_I$ the angular deviation of the axis of said housing from local vertical in any direction, $\Theta_{EW}$ the angular deviation in an East-West direction of the axis of said housing from the local vertical, and $d\Theta_{EW}/dt$ the time rate of change of said angular deviation in an East-West direction.

7. A gravity gradiometer in accordance with claim 6 wherein said angular deviation sensing means comprises inertial reference means incorporating means to generate said error signals, a fore-aft gimbal, a port-starboard gimbal, and gimbal actuating means response to said error signals.

* * * * *